US007980937B2

(12) United States Patent
Bennett, III

(10) Patent No.: US 7,980,937 B2
(45) Date of Patent: Jul. 19, 2011

(54) LOTTERY AUDIT SYSTEM

(75) Inventor: Joseph W. Bennett, III, Sugar Hill, GA (US)

(73) Assignee: Scientific Games International, Inc., Newark, DE (US)

( * ) Notice: Subject to any disclaimer, the term of this patent is extended or adjusted under 35 U.S.C. 154(b) by 1499 days.

(21) Appl. No.: 10/317,577

(22) Filed: Dec. 12, 2002

(65) Prior Publication Data

US 2003/0114213 A1 Jun. 19, 2003

(51) Int. Cl.
*A63F 13/00* (2006.01)

(52) U.S. Cl. ........................................... 463/17; 463/29

(58) Field of Classification Search ................ 463/1-69; 283/72

See application file for complete search history.

(56) References Cited

U.S. PATENT DOCUMENTS

| | | | | |
|---|---|---|---|---|
| 5,949,042 | A * | 9/1999 | Dietz et al. | 235/375 |
| 6,595,856 | B1 * | 7/2003 | Ginsburg et al. | 463/29 |
| 2002/0002076 | A1 * | 1/2002 | Schneier et al. | 463/29 |

* cited by examiner

*Primary Examiner* — James S McClellan

(74) *Attorney, Agent, or Firm* — Dority & Manning, P.A.

(57) ABSTRACT

In an instant lottery ticket system having a lottery administration host computer that includes a ticket validation file, security of the validation file is provided by an audit system that allows periodic audits of the validation file. Audit data, based on ticket data that is used to print the instant lottery tickets, can be compared to the information in the validation file to confirm the integrity of the validation file. The audit data can include all or a portion of the records that should be in the validation file or selected portions of data in the records such as ticket redemption values. Alternatively, the audit data can be computed from the ticket data into a data string for comparison with a data string computed from the validation file. Security can be further enhanced by incorporating time or other variable data in the data strings. The audit data can be transmitted to the host computer or placed on a read only memory for use by the host computer in the audit process.

11 Claims, 3 Drawing Sheets

LOTTERY AUDIT SYSTEM

FIELD OF THE INVENTION

The invention relates to instant lottery ticket systems and in particular to lottery systems using validation files to validate winning lottery tickets.

BACKGROUND OF THE INVENTION

In many instant lottery systems, especially those in the United States that are administered by state governments, winning tickets are presented by players to lottery agents for redemption. In many cases, in particular where the ticket has a high value, the lottery agent will enter ticket identification or validation data from the ticket into a lottery terminal using a bar code reader or manually inputting this data. This information is then transmitted to a host computer at the state lottery administration where this information is used to access a validation file. Typically, there is one record in the validation file for each such winning ticket that contains the redemption value of the ticket. The host computer validates that the ticket is indeed a winning ticket and relays this information to the lottery terminal. The lottery agent either pays the winning amount or refers the player to a regional lottery office.

However, it has been discovered that in some situations it is possible to make unauthorized alterations to or add validation records to the validation file in the host computer. Then for example, someone with access to the validation file can add a record containing a redemption value or a prize code to the validation file for what should be a losing lottery ticket, alter the face of the ticket to reflect this winning value and then present the lottery ticket to the lottery agent for redemption. In this manner, what would otherwise be a losing lottery ticket can be fraudulently redeemed for value. Also, the prize codes in one or more existing validation records could be altered to increase the redemption value of a ticket or turn a losing ticket in to a winning ticket.

SUMMARY OF THE INVENTION

It is therefore an object of the invention to improve the integrity of lottery validation and redemption systems.

It is another object of the invention to provide a method to insure that validation files in a lottery administration host computer are not altered.

A further object of the invention to provide a method for periodically auditing the integrity of a validation file by using audit data that includes at least a portion of the data that should be in the validation file for comparison with the information actually stored in the validation file.

Still another object of the invention is to provide a read-only media such as a compact disk (CD) having data corresponding to the data on a lottery administration host computer validation file that can periodically be read by the host computer to audit the validation file. The read-only media can be provided by the same entity or vendor that provided the validation file to the lottery administration. A small activation or initialization program on the read-only media can be used to initiate a read and compare or other audit programs on the host computer to compare the data on the read-only media to the validation data in the validation file and to generate reports reflecting any discrepancies.

Another object of the invention to provide a method for periodically auditing the integrity of a lottery validation file by converting at least a portion of the data that should be in the validation file into a first data string and comparing that string to a second data string computed from corresponding data stored on in a validation file on a lottery administration host computer. Security of the data string can be increased by using a variable parameter such as time in the computation of the data strings.

DETAILED DESCRIPTION OF THE INVENTION

Figure 1:
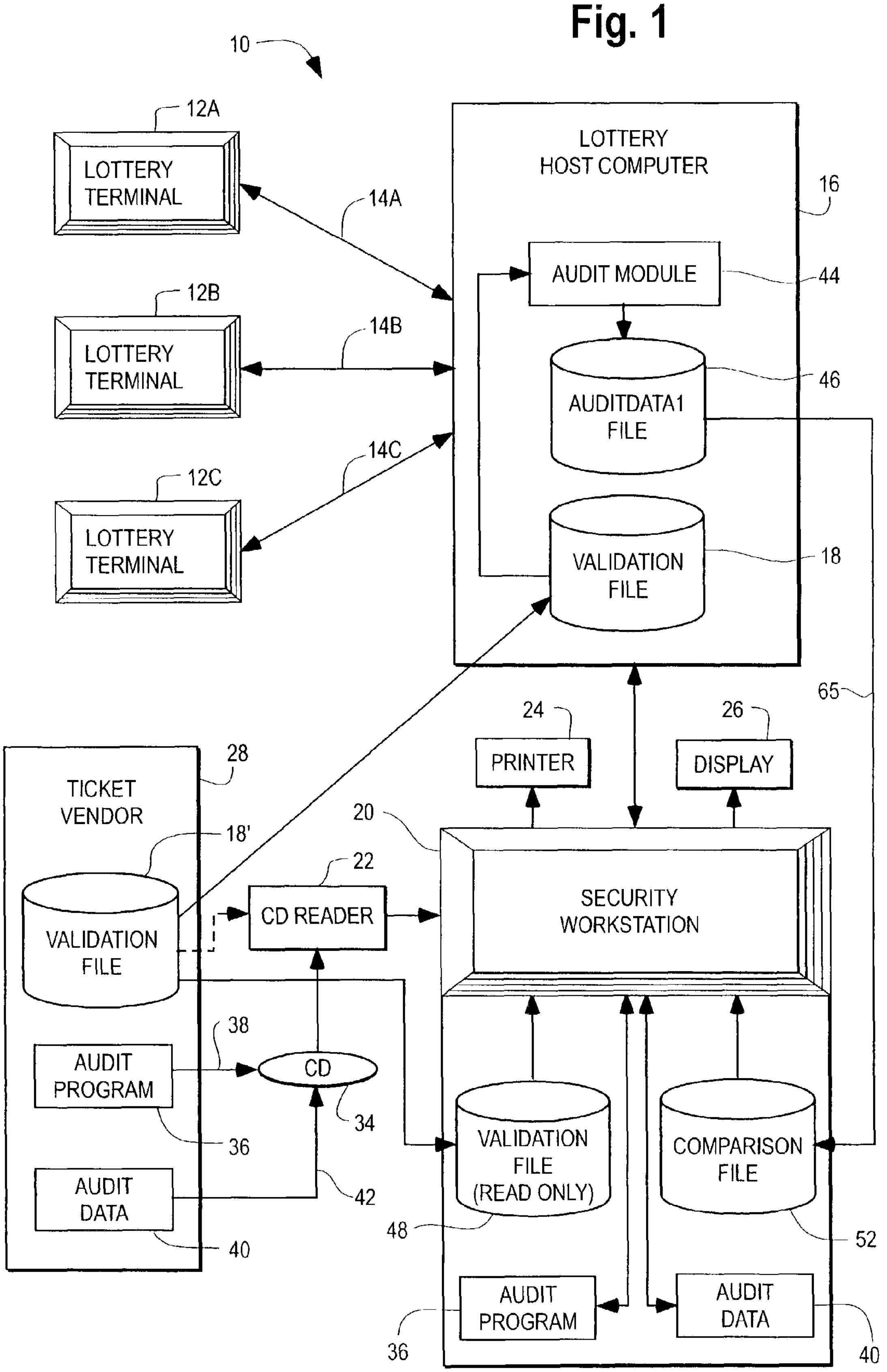
FIG. 1 is a block diagram of a lottery system according to the invention.

To illustrate a representative environment for the invention, FIG. 1 provides a block diagram of the basic hardware structure of a typical state administered lottery system 10 for selling and redeeming instant lottery tickets. Included in the system 10 are a number of agent terminals 12A-C that are connected, as represented by a set of lines 14A-C, to a lottery administration host computer 16. The agent terminals 12A-C usually include bar code readers, keyboards, displays and printers that a lottery agent can use for selling and redeeming instant lottery tickets. The connections 14A-C to the host computer 16 can be dedicated or dial-up telephone lines or other methods of communication such as satellite communications systems. Included in the host computer 16 memory is a validation file 18 that contains a set of validation information for each active game on the system. In many cases there is one record for each high tier or high value winning lottery ticket that requires validation through the host computer 16. However in other cases, the validation file 18 contains records for all the winning lottery tickets in a game or in certain circumstances, the validation file 18 will contain records for all of the lottery tickets in the game. Connected to the host computer 16 in this example is a security workstation 20 that usually contains or is connected to a data input device such as a compact disk (CD) reader 22, a printer 24 and a display 26. It should be understood that there are a variety of hardware configurations that can be used with the invention and that for instance, some or all of the functions of the security workstation 20 can be performed in the host computer 16 or other apparatus.

Also shown in FIG. 1, in representative block form, is a lottery ticket vendor 28 which prints lottery tickets for the lottery administration and, the for the purpose of describing the invention, is shown as creating a validation file 18' that can be the same or similar to the validation file 18 in the host computer 16. In this example, as indicated by a line 30, the ticket vendor 28 provides the lottery administration with the validation file 18 at the same time the lottery tickets are sent to the lottery administration. For simplicity of description, the vendor 18 is meant to represent the parties that create the lottery game and print the tickets which might not necessarily be the same party.

Typically, the first step in the process of manufacturing an instant lottery game, after the game has been designed, is for a lottery ticket vendor, as indicated at a block 28 in FIG. 1, to run a game generation program. The output of the game generation program is a ticket data file that is substantially the same as the validation file 18'. As indicated by a line 30, a copy or modified version of the validation file 18' is transferred to the host computer 16 and becomes the basis for the validation file 18. The contents of the ticket data file are used by the vendor 28 to print information on the lottery tickets which can include ticket identification data, a VIRN number and play indicia which is usually covered by a scratch-off coating In the United States lottery industry, it is the usual practice for the ticket vendor 28 to provide a state lottery with one or more sets of tickets where each set is defined as a game. Each game will normally have a predetermined number of winning tickets and a predetermined number of losing tickets. Very often the winning tickets are divided between high tier winners which have a high winning or redemption value and low tier winners which have relatively low winning values. In many cases, the vendor 28 provides the validation file 18 for each game. Usually, the validation file 18 includes a set of records where each record contains information relating to a lottery ticket which includes a ticket number, validation or VIRN number and a prize code representing the redemption value of the ticket. Depending on a variety of factors, the validation file 18 can be structured to contain a record for each high tier winning ticket, all winning tickets or each lottery ticket in the game. As indicated above, the vendor-supplied validation file can be transmitted 30 to validation file 18 in the host computer 16 or can be loaded into the host computer validation file 18 using a data input device such as the CD reader 22 as indicated by a dashed line 32.

In many state lotteries the practice is to require that high tier lottery tickets that are presented by a player to a lottery agent for redemption be validated by having the lottery agent transmit ticket identification information or validation information printed on the ticket from the lottery terminal such as 12A to the host computer 16. This information is then used to access the record in the validation file 18 which contains the redemption value as represented by the prize code for the ticket and this value is then transmitted back to the lottery terminal 12A. The usual practice is to have the lottery agent compare this value from the host computer 16 with the prize or winning value printed on the lottery ticket and if they are the same, the agent will pay the player this amount or provide the player with a form that he can use to redeem the ticket from the lottery administration.

In one embodiment of the invention, a read only memory such as a CD 34 is provided by the vendor 28 to the lottery administration for each game. Preferably, the security workstation 20 performs a validation file audit using a program or set of programs including an audit program 36 that can be provided by the ticket vendor 28 via the CD 34 as indicated by a line 38. In this embodiment of the invention, the CD 34 also contains a set of audit data 40 derived from the ticket data file or the validation file 18', as indicated by a line 42, that can be used to audit the validation file 18. For example, the audit data 40 can include a complete version of the validation file 18 for the game, a subset of the information in the validation file 18, or information in encrypted form that can be used to reconstruct at least part of the information in the validation file 18. Preferably, the security workstation 20 will initialize the audit program 36 so that it reads the validation file 18 in the host computer 16 and compares it with the audit data 40 and generates a report on the printer 24 or the display 26 indicating whether or not there is a discrepancy. Also, the validation reading program and/or the audit program 36 can be contained on the CD 34 as indicated by a line 42. In a variation of this embodiment of the invention, the validation file 18 is read and the audit program 36 creates an encrypted intermediate file containing the ticket validation number, the redemption value and other ticket control information. The information on the intermediate file is then compared to the audit data 40 which is in a similar format on the CD 34. As an example, the audit program 36 can perform a hash operation on the intermediate file and compare it to a similar operation on the information on the CD 34 to determine if the validation file 18 has been changed. Other audit approaches can be used by the audit program 36 such as computing the total value of the winning tickets in the validation file 18 and comparing it to the predetermined value for that game stored as the audit data 40 on the CD 34 to provide an indication that winning tickets have been added to the validation file 18. The CD 34 in this embodiment of the invention also contains an initialization program that will cause the audit program 36 in the security workstation 20 to execute. In order to enhance the security of this audit process, encryption and decryption algorithms can be used. For example, the audit data 40 and the initialization program on the CD 34 and the intermediate file can be encrypted and decrypted by using the public key method.

One method of using this audit process would be to have lottery administration security personnel periodically load the CD 34 into the CD reader 22 and cause the security workstation 20 to execute the initialization program, the validation file read program and the audit program 36. This can be accomplished by having the lottery administration employee operating the security workstation 20 click on an icon on the display 26 to read the CD 34. At the termination of the audit program 36, the security workstation can display on the display 26 or print out on the printer 24 a report indicating whether or not the integrity of the validation file has been compromised. Because the validation information on the CD 34 is in read-only format and thus can not be altered and also through the use of encryption, it would be substantially more difficult for someone having direct access to or hacking into the lottery host computer 16 to manipulate or make changes in the validation file 18.

In the preferred embodiment of the invention, the records in the validation file 18 are converted into a single data form that can be compared to data in the same data form computed from the original validation data such as the validation file 18' created by the vendor 28. This process of creating a hash or a checksum that mathematically identifies data in the host validation file can be performed on a continuous basis or can be performed in a pre-determined periodic basis. In the particular arrangement shown in FIG. 1, an audit module program 44 located in the host computer 16 converts at least a portion of the records, such as the records representing the high tier lottery tickets, in the validation file 18 into a data string and stores it in a file termed an auditdata1 file 46. A read-only validation file 48 obtained from the vendor 28, electronically as indicated by a line 50 or via the CD 34, is stored in the security workstation 20. The audit program 36 utilizes the same process to convert the records in the read-only validation file 48 into a data string which is stored in the audit data file 40 in the security workstation 20. To increase security, the computation of the data strings can include a string identifier such as time information. Then the audit program 36 in this case can be used to compare a set of the data strings in the auditdata1 file with a corresponding set of the data strings in the comparison file 52 and if there is a difference in the data strings an error report is generated. In addition to time, the string identifier which is preferably generated by the audit module 44 can be a random or sequential number or another type of identifying data.

Figure 2:
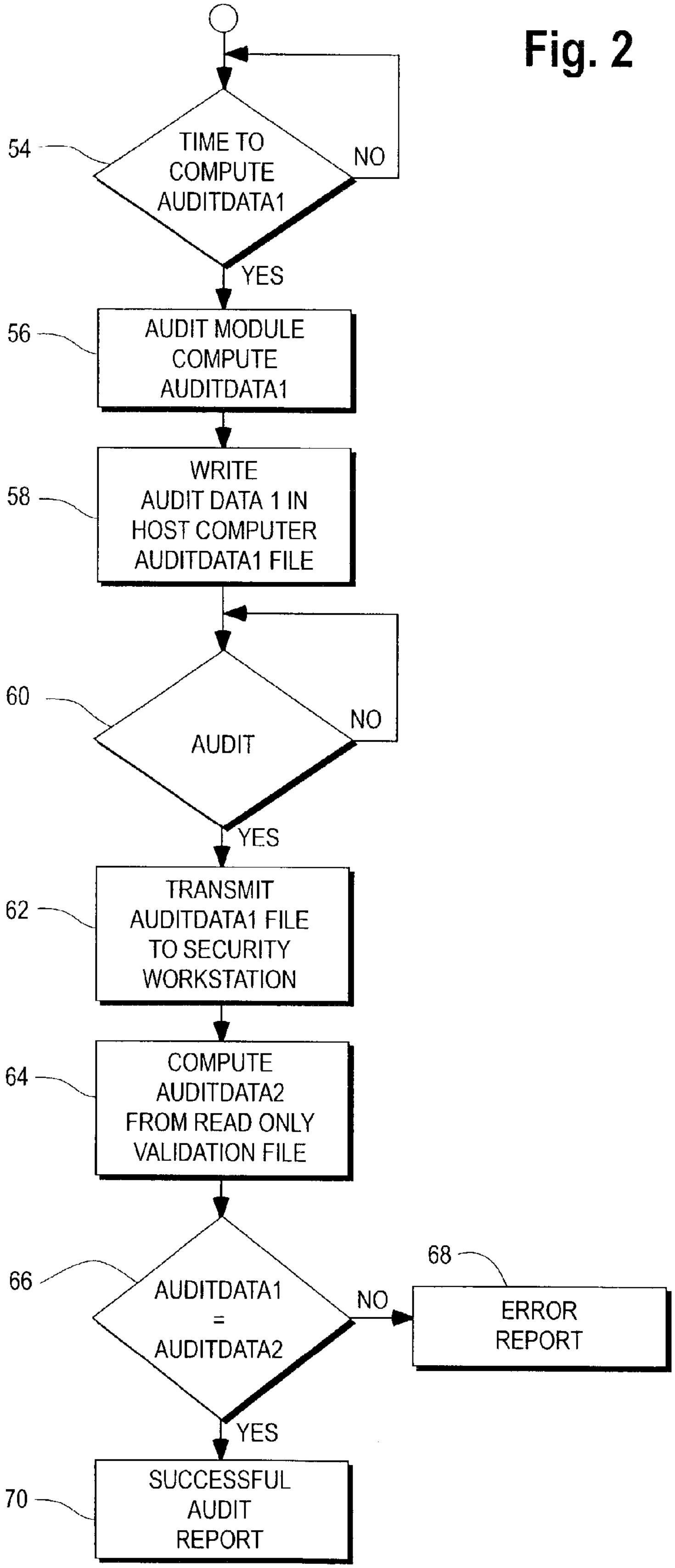
FIG. 2 is a flow chart of an audit process for use with the system of FIG. 1.

FIG. 2 is a flow chart that illustrates the preferred implementation of the process outlined above. Once the validation file 18 and audit module program 44 have been loaded in the host computer 16, a routine indicated by a decision block 54 determines if it is time to compute an auditdata1 data string. Preferably, this computation is done at periodic intervals such as once a week or once a day; but most certainly, the frequency of the computation can be determined by the lottery security administration and configured in the audit module. If it is time to perform the computation, the audit module will, as shown at a block 56, compute the auditdata1 data string. There are a number of suitable algorithms that can be used to generate the auditdata1 data string with the preferred method described below in connection with FIG. 3. Then, as depicted in a block 58, the data string will be stored in the auditdata1 file 46. Each auditdata1 data string so computed will occupy a record in the auditdata1 file 46. In the preferred embodiment, each auditdata1 data string will be computed with a time factor, and that time factor will also be included with the auditdata1 data string stored its record in the auditdata1 file 46. The next step in the process, as represented by a decision block 60 is to determine if an auditor compare function is to be preformed. This process can be performed periodically or, for example, be started by lottery administration personnel initiating the audit program 36 on the security workstation 20. Next, as shown in a block 62, the audit program 36 causes the host computer 16 to transmit the contents of the auditdata1 file 46 to the comparison file 52 in the security workstation 20 as indicated by a line 65 in FIG. 2. Also, as indicated by a block 64, the audit program 36 computes the corresponding auditdata2 data strings from the read only validation file 48 and stores them in corresponding records in the audit data file 40. Where the auditdata1 data strings include a string identifier such as time, that information will be used by the audit program 36 in generating the corresponding auditdata2 data strings. Then, as illustrated by a decision block 66, the corresponding auditdata strings in the audit data file 40 and the comparison file 52 are compared and if there is a difference, an error report, shown at a block 68, is generated by the audit program 36 and displayed on the display 26 or printed out on the printer 24. Such an error report 68 will provide the lottery administration with an indication that the validation file 18 in the host computer 16 might have been tampered with. On the other hand, if the data strings are the same, a report, as indicated by a block 70, will be generated indicating that the validation file 18 has successfully passed the audit.

Figure 3:
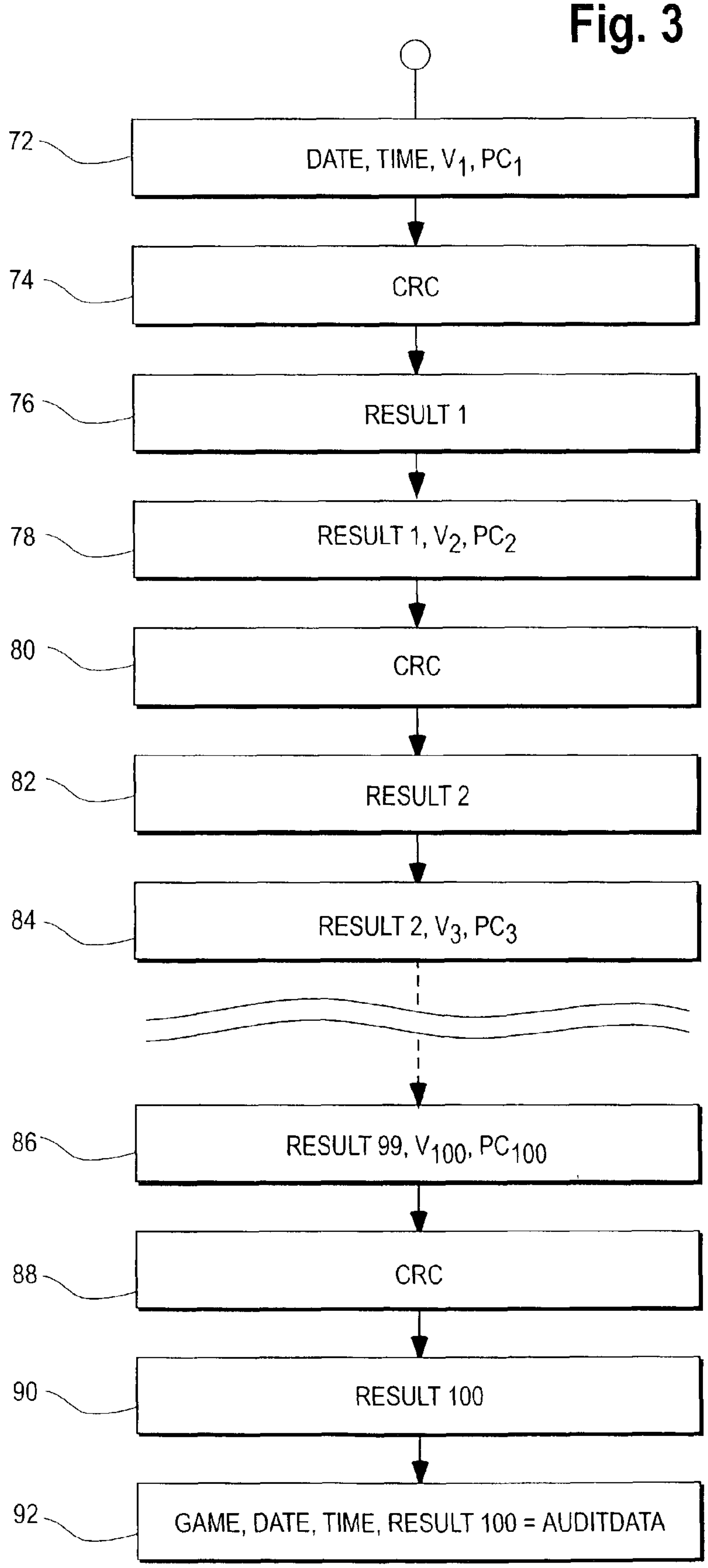
FIG. 3 is a flow diagram of a process for computing a data string for use with the process of FIG. 2.

FIG. 3 illustrates the preferred algorithm for generating the auditdata strings from, for example, a validation file 18 that contains records for 100 lottery tickets. In this case, the algorithm utilizes an industry-standard 32-bit CRC algorithm; and the time information includes a date as well as clock time. To improve security, time as a string identifier is used to compute and to identify the auditdata1 and auditdata2 strings. At the start of the algorithm, as indicated by a block 72, time information including the current time and date (Time) is combined with the validation data ($V_1$) and the prize code ($PC_1$) from the first record in the validation file 18. This quantity is then operated on by the CRC algorithm as shown at a block 74 and produces a Result1 that is depicted at a block 76. Then, as shown at a block 78, Result1 is combined with the validation data ($V_2$) and the prize code ($PC_2$) from the second record in the validation file 18. This quantity is again operated on by the CRC algorithm as shown at a block 80 and produces a Result2 that is depicted at a block 82. This process is repeated for each of the 100 records in the validation file 18 until Result100 is obtained as shown in a set of blocks 84-90. This process can be stated as:

$$\text{Result}_n = ABS(CRC(\text{Result}_{n-1}, VIRN_n, p\text{code}_n))$$

where: n represents the number of records in the validation file 18 that are to be used for the auditdata data string computation; VIRN represents the validation data in the record that is used in the computation; and pcode represents the prize code. The auditdata data string is then constructed as depicted at a block 92 using a concatenated 32 digit output string:

$$\text{concat(Game Number,Time,Result}_n)$$

An example of such a string might be: 21702152001084500000945677234 where the computation was performed on game number 217 at 08:45 AM on Feb. 15, 2001 resulting in a auditdata data string of 000000945677234 which breaks down as:

| Game No. | Date | Time | Result(n) |
|---|---|---|---|
| 217 | 02152001 | 0845 | 000000945677234 |

It should be noted that this example of the calculated auditdata data string will be different if calculated at any other time or date thus substantially enhancing the security of the auditing system. As a result, the Date and Time portions of the auditdata1 data strings stored in the comparison file 52 are used by the audit program 36 so that the auditdata2 data strings are computed for corresponding records in the validation file 48 such that if there have been no changes to any of the records in the validation file 18, the auditdata2 data strings will be the same as the auditdata1 strings.

It should be noted that the above embodiment of the invention was described in terms of a single game contained in one validation file 18. However, very often the host computer 16 will contain a number of games each in its own validation file. One of the advantages of the preferred embodiment of the audit system described in connection with FIG. 2 is that it can use the logic described above to perform periodic audits on all of the active validation files in the host computer.

There are a variety of ways that the audit system described above can be implemented. Although the system of FIG. 1 is described as having the lottery ticket vendor 28 create the validation file 18' or audit data 40 from ticket data file, it is possible, for example, to have a third party such as a game design vendor or firm create these files and the audit program 36 from game design data such as a ticket file corresponding to the ticket data file provided the lottery ticket vendor 40 to print the lottery tickets. Also, it will be appreciated that a large number of hardware configurations can be used such as having all the audit functions described above performed in the host computer 16 or portions performed by third parties in other computers.

I claim:

1. A method for periodically auditing a lottery system, that includes a host memory in a lottery administration host computer containing a set of lottery ticket information including redemption values, comprising the step of:

providing a set of audit data having audit information related to a predetermined set of the lottery ticket information that should be in the host memory;

for each audit process, operating an audit program to audit at least a portion of the lottery ticket information in the host computer by comparing said audit data to at least a portion of the lottery ticket information in said host memory, said audit program performing the following steps for each audit process:

generating a first data string from the lottery ticket information in said host computer, and storing the first data string;

generating a second data string from the audit data, and storing the second data string;

the first and second data strings having a corresponding string identifier that is unique to each audit process wherein the string identifier is generated with additional information not contained in the first or second data strings and the information is unique to the particular audit process;

comparing the first data string to the second data string; and generating a report containing an indication if there is at least one predetermined type of discrepancy in the lottery ticket information in the host memory from said set of predetermined lottery ticket information as indicated by differences between the first and second data strings thereby auditing the integrity of at least a portion of the information in the host memory.

2. The method of claim 1 wherein said audit data is contained in a read only memory.

3. The method of claim 2 wherein said read only memory is a compact disk.

4. The method of claim 2 wherein said read only memory includes said audit program.

5. The method of claim 1 wherein the set of lottery ticket information is contained in a validation file in said host computer.

6. The method of claim 1 wherein said audit data includes at least a subset of the lottery ticket information.

7. The method of claim 6 wherein said audit data includes substantially all of the lottery ticket information.

8. The method of claim 7 wherein lottery ticket information is contained in a validation file in the host memory and wherein said audit data is a substantially reproduced version of said validation file.

9. The method of claim 1 wherein said audit program utilizes the lottery ticket information in the host memory to reproduce at least a portion of the lottery ticket information.

10. The method of claim 9 wherein said audit data is contained in a read only memory separate from the host computer and said read only memory includes said audit program.

11. The method of claim 1 wherein said audit data is contained in a read only memory separate from the host computer and said audit program is resident on said host computer.

* * * * *